US012379973B2

United States Patent
Dhoot et al.

(10) Patent No.: US 12,379,973 B2
(45) Date of Patent: Aug. 5, 2025

(54) CROSS SERVICE LOCK HANDLING

(71) Applicant: STRIPE, INC., South San Francisco, CA (US)

(72) Inventors: Tushar Dhoot, Seattle, WA (US); Dusty Regan Burwell, Chicago, IL (US); David Vasilevsky, Montreal (CA)

(73) Assignee: STRIPE, INC., South San Francisco, CA (US)

( * ) Notice: Subject to any disclaimer, the term of this patent is extended or adjusted under 35 U.S.C. 154(b) by 690 days.

(21) Appl. No.: 17/829,089

(22) Filed: May 31, 2022

(65) Prior Publication Data

US 2023/0385128 A1  Nov. 30, 2023

(51) Int. Cl.
*G06F 9/52* (2006.01)

(52) U.S. Cl.
CPC .................................. *G06F 9/526* (2013.01)

(58) Field of Classification Search
CPC ........ G06F 9/526; G06F 9/52; G06F 16/2343; G06F 16/1774; G06F 12/1466
See application file for complete search history.

(56) References Cited

U.S. PATENT DOCUMENTS

| | | | |
|---|---|---|---|
| 2008/0082761 A1* | 4/2008 | Herness | G06F 16/2343 707/E17.007 |
| 2010/0023521 A1* | 1/2010 | Arcese | G06F 16/2343 707/E17.007 |
| 2012/0144138 A1* | 6/2012 | Kandasamy | G06F 9/524 711/E12.001 |
| 2019/0075084 A1* | 3/2019 | Ding | H04L 63/104 |
| 2022/0114145 A1* | 4/2022 | Piao | G06F 16/1824 |

\* cited by examiner

*Primary Examiner* — Brian W Wathen
(74) *Attorney, Agent, or Firm* — Womble Bond Dickinson (US) LLP

(57) ABSTRACT

A method and system for performing lock handling across multiple servers. In one embodiment, the method comprises receiving, by a second server, a first request of a service from a first server, the first request including first metadata which includes lock information of a lock held by the first server. The method comprises extracting the lock information from the first metadata and storing the lock information in a locking table without the lock being transferred to the second server. The method further comprises executing application code to perform the service, including, while executing the application code, determining whether the lock exists based on the lock information in the locking table, and passing a lock check in response to determining that the lock exists.

23 Claims, 6 Drawing Sheets

CROSS SERVICE LOCK HANDLING

FIELD

Embodiments of the present disclosure relate to the field of software; more particularly, embodiments of the present disclosure relate to lock handling across multiple servers.

BACKGROUND

We need mutual exclusion to ensure two conflicting operations on the same object cannot take place. One way of enforcing mutual exclusion is using a lock. The lock works well when a single service is involved, however, it is difficult to use a lock when multiple different services might be operating on the same object. This difficulty is compounded when a lock of an existing service is going to be used continuously while migrating away from the existing service to a new service. Currently, a separate centralized locking service is used to manage the lock among multiple services. However, migrating all existing usages and roundtrips to the centralized service adds the latency to the process. It is very difficult for other services to acquire a lock that is fully compatible with the lock of the existing service.

In addition, when a lock was taken out on a different service, it is difficult to ensure low-level libraries and code of the service still work. For example, the code of the service may be written for a single service and therefore that the lock may be taken out locally. Finding and migrating all the checks for the lock may be very time consuming.

SUMMARY

A method and system for performing lock handling across multiple servers. In one embodiment, the method comprises receiving, by a second server, a first request of a service from a first server, the first request including first metadata which includes lock information of a lock held by the first server. The method comprises extracting the lock information from the first metadata and storing the lock information in a locking table without the lock being transferred to the second server. The method further comprises executing application code to perform the service, including, while executing the application code, determining whether the lock exists based on the lock information in the locking table, and passing a lock check in response to determining that the lock exists.

BRIEF DESCRIPTION OF THE DRAWINGS

The present disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

In the following description, numerous details are set forth to provide a more thorough explanation of the present disclosure. It will be apparent, however, to one skilled in the art, that the present disclosure may be practiced without these specific details. In other instances, well-known structures and devices are shown in block diagram form, rather than in detail, to avoid obscuring the present disclosure.

Techniques are disclosed herein for handling a lock among multiple servers or services. In one embodiment, there may be a migration from an existing server to one or more new servers. The existing server may have already taken a lock and hold the lock. There may be application code written for the service running on the existing server, including checks for the lock. The existing server may send a request to the one or more new servers with lock information regarding the lock added in metadata of the request, such that the one or more new servers may be aware of the lock information. The one or more new servers then handle the lock information by adding the lock information to their local list of locks in a way that is indistinguishable from when the lock was actually acquired locally by the one or more new servers respectively. Thus, the respective application code in the one or more new servers may pass the checks for the lock to verify the lock, as if the lock is truly held in the one or more new servers.

In one embodiment, remote procedure call (RPC) middleware may be used in the one or more new servers to handle the lock information. There may be no code changes for the one or more new servers, and the one or more new servers may "just work" as if the lock is actually held. Furthermore, lock leases/timeouts may be included in the lock information such that a check to a centralized server is not required in order to verify the incoming lock information is valid, thereby saving time and reducing the latency.

In one embodiment, a new abstraction, for example, a wrap-in-lock (WIL), may be introduced on the existing server that may be called by any of the one or more new servers to acquire the lock. Then, the existing server may return the lock information regarding the acquired lock to the calling service. Since the lock is taken out by the existing server, it is compatible with all existing application code for the lock of the existing server.

Figure 1:
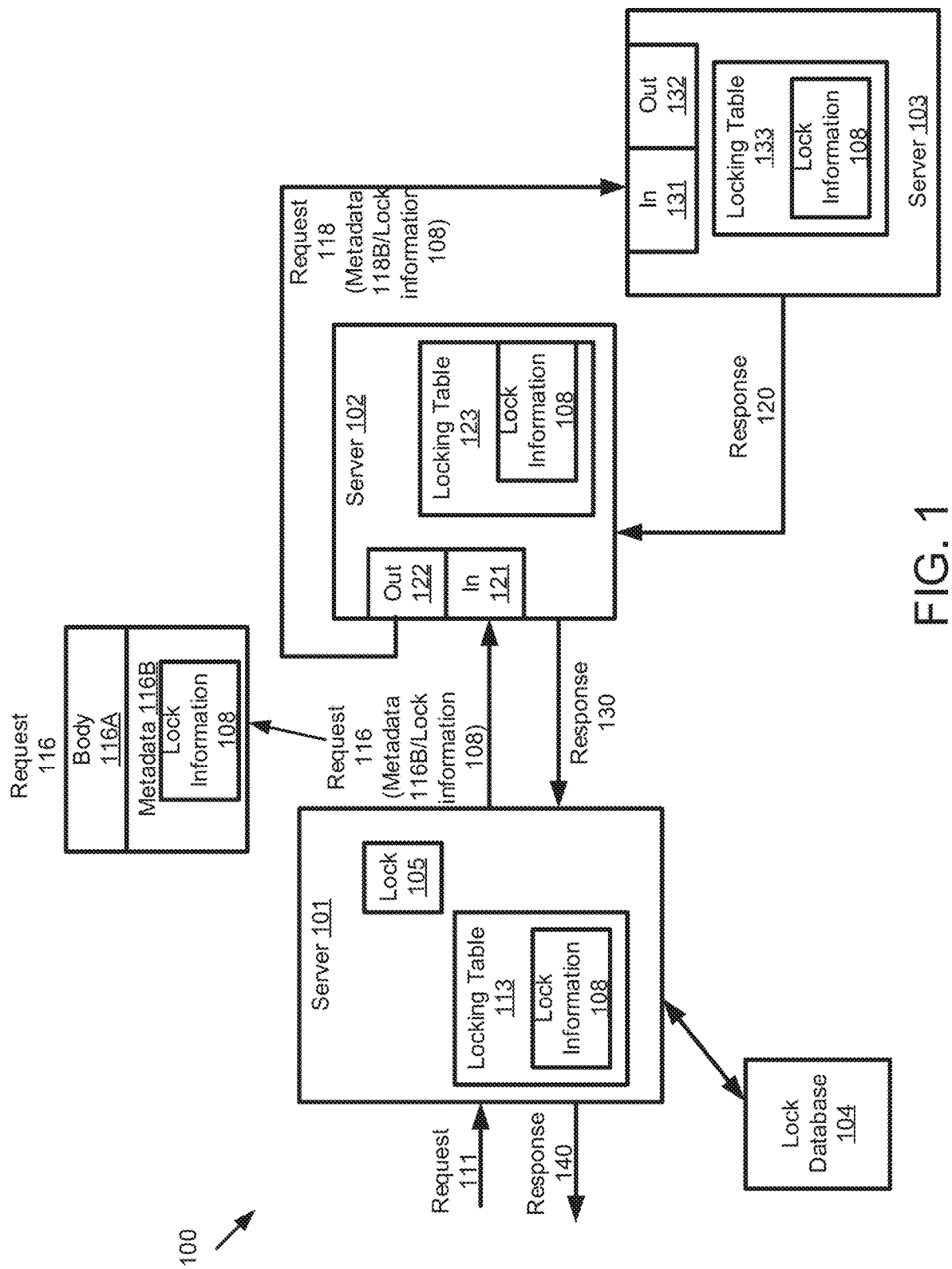
FIG. 1 is a block diagram of an example of a system with multiple servers for handling a lock.

FIG. 1 is a block diagram of an example of a system 100 with multiple servers (e.g., 101, 102, 103) for handling a lock. Referring to FIG. 1, the system 100 may include a server 101 (e.g., an existing server) and one or more other servers 102, 103 (e.g., new servers). For example, service(s) of the existing server 101 may be in a process of migrating from the server 101 to the one or more other servers 102, 103. Though only two servers 102, 103 are illustrated in FIG. 1, the one or more other servers may include any number of servers.

As an example, the server 101 may receive a request 111 from a user. For example, the request may be a request for a service, e.g., a request to create a subscription, to withdraw money from a bank account, etc. The request 111 may need a lock. Then, the server 101 may take or acquire a lock 105, e.g., for the service, and hold the lock 105. As an example, a lock may refer to a mechanism that enforces limits on access to a resource when there are many threads of execution. A lock may be designed to enforce a mutual exclusion concurrency control policy.

The server 101 may search a lock database 104, which may store information of all locks. The server 101 may obtain lock information 108 of the lock 105 from the lock database 104 and insert the lock information 108 into a local locking table 113. The locking table 113 may include a list of locks on the server 101, and locking information of each lock of the server 101. For example, the locking information 108 of the lock 105 may include a token of the lock, a timeout of the lock, a lease of the lock, etc. The locking information 108 may indicate a state of the lock 105, e.g., the state of "being held" on the server 101.

The server 101 may pass the lock information 108 of the lock 105 to the server 102. The server 102 may insert the lock information 108 into a local locking table 123. The locking table 123 may include a list of locks on the server 102, and locking information of each lock of the server 102. Thus, the server 102 may have the locking information 108 of the lock 105 in the local locking table 123. After being inserted into the locking table 123 of the server 102, the locking information 108 may indicate a state of the lock 105, e.g., the state of "being held" on the server 102. The locking information 108 of the lock 105 is treated the same as locking information of other locks being held locally by the server 102 in the locking table 123.

The server 102 may execute application code to perform a service. There may be lock checks in the application code. The lock checks may check whether the current server has the lock. The application code may include other functions which depend on a state of a lock of "being held" locally by the server. As an example, the lock checks may verify the server 102 is holding the lock 105. As another example, the functions depended on the state of the lock may run based on the state of the lock of "being held" on the server 102. If the lock checks are not passed, the application code may fail. When executing the application code, the server 102 may determine that the lock 105 is being held based on the locking information 108 of the lock 105 in the locking table 123. Thus, the lock checks are passed for the lock 105, and the functions depended on the state of the lock may run on the server 102. Therefore, a round trip to a standalone centralized lock management server is avoided, thereby saving the latency.

Furthermore, because the lock 105 is taken by the server 101, the application code associated with the lock 105 on the server 101 may also be reused on the server 102, thereby saving computation resources. For example, the server 101 may be the existing server. There may be application code written for the service including lock checks on the server 101. By pass the lock information 108 of the lock 105 to the server 102, instead of the server 102 acquiring a lock locally, application code written associated with the lock checks on the server 101 may be reused on the server 102.

Referring to FIG. 1, the server 101 sends a request 116 to the server 102 and passes lock information 108 of the lock to the server 102. For example, the request 116 may be a server to server request, such as a RPC request (e.g., a Google™ RPC (gRPC request)). The request 116 may include a main body 116A which may be an actual request of the service. For example, the main body of the request may be to create the subscription, to withdraw money from a bank account, etc. The request 116 may further include metadata 116B which may have a generic format. For example, the lock information 108 may be attached to the metadata 116B. The lock information 108 of the lock 105 may be passed in the metadata 116A of the request 116 to the server 102. Because the metadata has a generic format, the metadata may work with any server. In another embodiment, the lock information 108 may be included in one or more fields in the main body 116A of the request 116.

In one embodiment, the lock information 108 of the lock 105 may include a lock token of the lock 105. The lock token may uniquely identify the lock 105. For example, the lock token may be a lock identifier (ID) of the lock 105. In one embodiment, the lock information 108 may include information of a time out (e.g., when the lock 105 expires), or a lock lease, or a type of the lock, etc. In this way, a check to a centralized server is not required in order to verify the incoming lock information is valid, thereby saving round-trip time and reducing the latency.

The server 102 receives the lock information 108 of the lock 105 and handles the lock information 108 by adding the lock information 108 to a local list of locks in a way that is indistinguishable from that when the lock was actually acquired locally by the server 102. Thus, the application code in the server 102 passes the lock checks for the lock 105 to verify the lock 105, as if the lock 105 is held in the server 102.

In one embodiment, RPC middleware may be used in the one or more other servers 102, 103 to handle the lock information. There may be no code changes for the one or more other servers 102, 103, and the one or more other servers 102, 103 may "just work" as if the lock is actually held by the one or more other servers 102, 103.

For example, the server 102 may include an inbound handler 121 and an outbound handler 122, which may be RPC middleware. The inbound handler 121 and the outbound handler 122 may run transparently in the server 102. As an example, the inbound handler 121 and the outbound handler 122 may run on every request on the server 102. The inbound handler 121 and the outbound handler 122 may form a transparent layer to handle every request. However, the inbound handler 121 and the outbound handler 122 may not impact the business logic inside of the server 102. None of the business logic inside of the server 102 even needs to know that the inbound handler 121 and the outbound handler 122 are running because the request is being handled at the layer of the inbound handler 121 and the outbound handler 122.

Referring to FIG. 1, the inbound handler 121 of the server 102 may receive the request 116. The inbound handler 121 may check whether there is the metadata 116B in the request 116. After determining there is the metadata 116B in the request 116, the inbound handler 121 may check whether there is the lock information 108 in the metadata 116B. The inbound handler 121 may extract the lock information 108 from the metadata 116B. After extracting the lock information 108, the inbound handler 121 may insert the lock information 108 of the lock 105 into a locking table 123 of the server 102 (e.g., a local locking table), which stores lock information of all the locks on the server 102. The lock information 108 of the lock 105, which is actually being held by the server 101, is treated the same as lock information of other locks, which are acquired and being held locally by the server 102, in the locking table 123. Thus, the server 102 is aware of the lock information 108 of the lock 105.

In one embodiment, the server 102 may execute application code to perform the service of the request 116, e.g., to create the subscription, to withdraw the money from the bank account, etc. There may be lock checks for the lock 105 in the application code to verify whether the lock 105 exists or if the server 102 is holding the lock 105. If the lock checks are not passed, the application code may fail. When executing the application code, whether to pass the lock checks for the lock 105 is determined based on the locking information 108 of the lock 105 in the locking table 123. Because the locking information 108 of the lock 105 is treated the same as locking information of other locks being held locally by the server 102 in the locking table 123, the server 102 may determine that the server 102 is holding the lock 105 based on the locking information 108 of the lock 105 in the locking table 123. Therefore, the lock checks are passed for the lock 105 when executing the application code, even though the server 102 doesn't actually hold the lock 105 and the server 101 is holding the lock 105. The server 102 may pass the lock checks for the lock 105 without a round trip to a standalone centralized lock management server, thereby saving the latency. Furthermore, because the lock 105 is taken by the server 101, the application code associated with the lock 105 on the server 101 may also be reused on the server 102, thereby saving computation resources.

After executing the application code to perform the service of the request 116 and the service is completed, the server 102 may send a response 130 to the server 101. For example, the response 130 may indicate the service being completed, e.g., the subscription being created, the invoice of the service, the receipt of the money being withdrawn, etc. The response 130 may further include an indication to release the lock 105. After receiving the response 130, the server 101 may release the lock 105. The server 101 may no longer hold the lock 105. The server 101 may send a response 140 to the user to indicate the service being completed.

In one embodiment, the server 102 may send a request 118 to the server 103 and further pass the lock information 108 of the lock 105 to the server 103. For example, the request 118 may be another server to server request, e.g., another gRPC request, such as creating an invoice, etc. The outbound handler 122 of the server 102 may send the request 118 with metadata 118B, which may include the lock information 108 of the lock 105. For example, all outbound requests may go through the outbound handler 122. The outbound handler 122 may obtain the lock information 108 from the locking table 123 and attach the lock information 108 to the metadata 118B of the request 118. As an example, the outbound handler 122 may take the lock information 108, e.g., the lock token, and insert the lock information 108 into the metadata of the request 118.

As illustrated in FIG. 1, an inbound handler 131 of the server 103 may receive the request 118, check for the metadata 118B, and check for the lock information 108. After determining there is the lock information 108 in the request 118, the inbound handler 131 may store the lock information 108 in a locking table 133 of the server 103. When executing application code, whether to pass the lock checks for the lock 105 is determined based on the locking information 108 in the locking table 133. Thus, the server 103 determines that the server 103 is holding the lock 105 based on the locking information 108 in the locking table 123 when executing the application code. Therefore, the application code passes the lock checks for the lock 105 and runs successfully on the server 103.

After executing the application code to perform the service of the request 118 and the service is completed, the server 103 may send a response 120 to the server 102. For example, the response 120 may indicate the service being completed, e.g., the subscription being created, the invoice of the service, the receipt of the money being withdrawn, etc. The response 120 may further include an indication to release the lock 105. After receiving the response 120, the server 102 may send the response 130 to the server 101 with an indication to release the lock 105. The server 101 may no longer hold the lock 105. The server 101 may send the response 140 to the user to indicate the service being completed, e.g., the subscription being created, the invoice of the service, the receipt of the money being withdrawn, etc.

In this way, the lock information 108 of the lock 105 may be passed to the server 102, the server 103, and any number of other servers. A roundtrip to a centralized lock managing server is avoided, thereby reducing the computing resources and the latency. The application code associated with the lock for the server 101 may be reused for the servers 102, 103, thereby saving time and computing resources.

Figure 2:
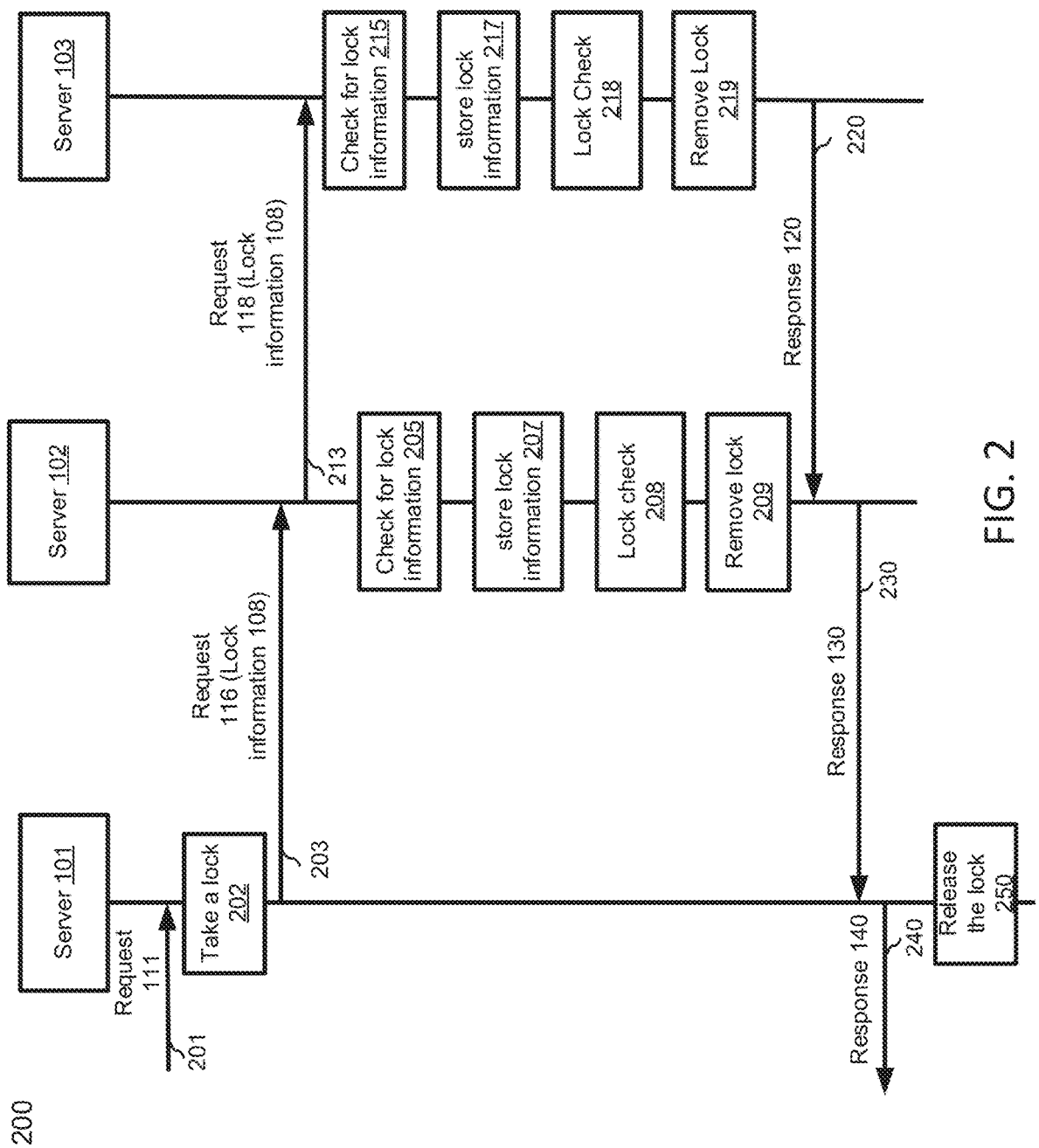
FIG. 2 is a flow diagram of one embodiment of a process of passing lock information across multiple servers.

FIG. 2 is a flow diagram 200 of one embodiment of a process of passing lock information across multiple servers 101, 102, and 103. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. For example, service(s) of the server 101 may be in a process of migrating from the server 101 to the one or more other servers 102, 103. Though only two servers 102, 103 are illustrated, the one or more other servers may include any number of servers.

Referring to FIG. 1 and FIG. 2, at operation 201, the server 101 may receive a request 111 from a user. For example, the request may be a request for a service, e.g., a request to create a subscription, to withdraw money from a bank account, etc. The request 111 may need a lock.

At operation 202, the server 101 may take or acquire a lock 105, e.g., for the service, and hold the lock 105.

At operation 203, the server 101 sends a request 116 to the server 102 and passes lock information 108 of the lock to the server 102. For example, the request 116 may be a server to server request, such as a RPC request. The request 116 may include a main body 116A which may be an actual request of the service. For example, the main body of the request may be to create the subscription, to withdraw money from a bank account, etc. The request 116 may further include metadata 116B. In one embodiment, the metadata 116B may include the lock information 108. In another embodiment, the lock information 108 may be included in one or more fields in the main body 116A of the request 116. In one embodiment, the lock information 108 of the lock 105 may include a lock token of the lock 105. The lock token may uniquely identify the lock 105. For example, the lock token may be a lock identifier (ID) of the lock 105. In one embodiment, the lock information 108 may further include information of a time out, a lock lease, or a type of the lock, etc. In this way, a check to a centralized server is not required in order to verify the incoming lock information is valid, thereby saving round-trip time and reducing the latency.

At operation 205, the server 102 may check whether there is the lock information 108 in the metadata 116B of the request 116. In one embodiment, the server 102 may check whether there is the metadata 116B in the request 116 prior to checking whether there is the lock information 108.

At operation 207, after finding the lock information 108 in the metadata 116B, the server 102 may insert the lock information 108 of the lock 105 into a locking table 123 of the server 102 and store the lock information 108 in the locking table 123.

At operation 208, the server 102 may execute the application code and run lock checks for the lock 105. While executing the application code, the server 102 may run lock checks to determine whether the lock 105 exists based on the lock information 108 in the locking table 123, e.g., to verify if the server 102 is holding the lock 105. The server 102 may determine whether to pass the lock checks for the lock 105 based on the locking information 108 in the locking table 123. Because the locking information 108 of the lock 105 is treated the same as locking information of other locks being held locally by the server 102 in the locking table 123, the server 102 determines that the server 102 is holding the lock 105 based on the locking information 108 in the locking table 123. Therefore, the application code passes the lock checks for the lock 105 and runs successfully on the server 102.

At operation 209, the server 102 may remove the lock 105, e.g., from the locking table, after the service has finished or the execution of the application code has been finished.

At operation 213, the server 102 may send a request 118 to the server 103 and pass the lock information 108 of the lock to the server 103. The request 118 may include metadata 118B. In one embodiment, the metadata 118B may include the lock information 108.

At operation 215, the server 103 may check whether there is the lock information 108 in the metadata 118B of the request 118. In one embodiment, the server 103 may check whether there is the metadata 118B in the request 118 prior to checking whether there is the lock information 108.

At operation 217, after finding the lock information 108 in the metadata 118B, the server 103 may insert the lock information 108 of the lock 105 into a locking table 133 of the server 103 and store the lock information 108 in the locking table 133.

At operation 218, the server 103 may execute the application code and run lock checks for the lock 105. While executing the application code, the server 102 may run lock checks to determine whether the lock 105 exists based on the lock information 108 in the locking table 123, e.g., to verify if the server 103 is holding the lock 105. The server 102 may determine to pass the lock checks for the lock 105 based on the locking information 108 in the locking table 123.

At operation 219, the server 103 may remove the lock 105, e.g., from the locking table 133, after the service has finished or the execution of the application code has been finished.

At operation 220, the server 103 may send the response 120 to the server 102 with an indication to release the lock 105. For example, the response 120 may indicate the service being completed, e.g., the subscription being created, the invoice of the service, the receipt of the money being withdrawn, etc.

At operation 230, the server 102 may send the response 130 to the server 101 with an indication to release the lock 105. For example, the response 130 may indicate the service being completed, e.g., the subscription being created, the invoice of the service, the receipt of the money being withdrawn, etc.

At operation 240, the server 101 may send a response to the user, for example, the response may inform the user the service being completed, e.g., the subscription created, the invoice of the service, the receipt of money being withdrawn, etc.

At operation 250, the server 101 may release the lock 105.

By this process, the lock 105 may be handled across the servers 101, 102, 103 without roundtrips to a standalone centralized lock managing server, and the lock checks for the lock 105 in the servers 102, 103 are passed without the lock actually being held in the servers 102, 103. Furthermore, the application code of the server 101 regarding the lock may still be reused in the servers 102, 103. Therefore, this process increases the computing efficiency, saves the computing resources and reduces the latency.

Figure 3A:
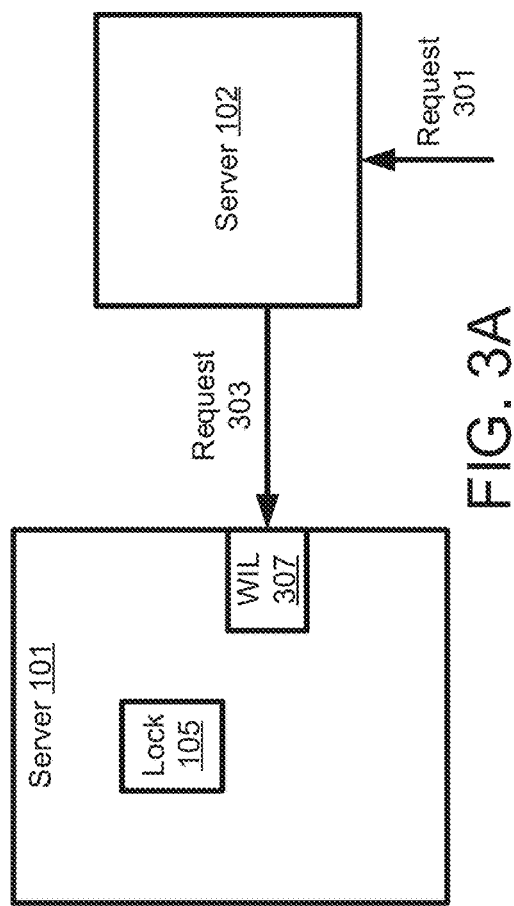
FIGS. 3A-3C are block diagrams of an example of using a wrap-in-lock to acquire the lock information 108.
Figure 3B:
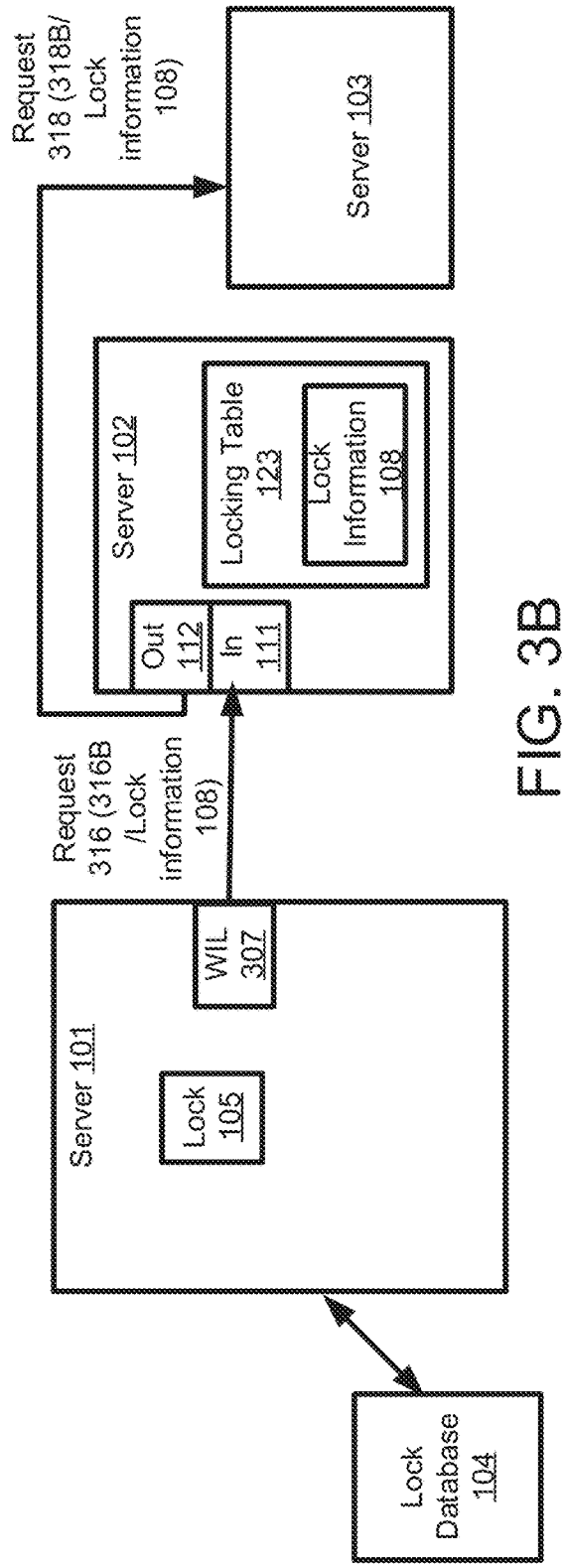
Figure 3C:
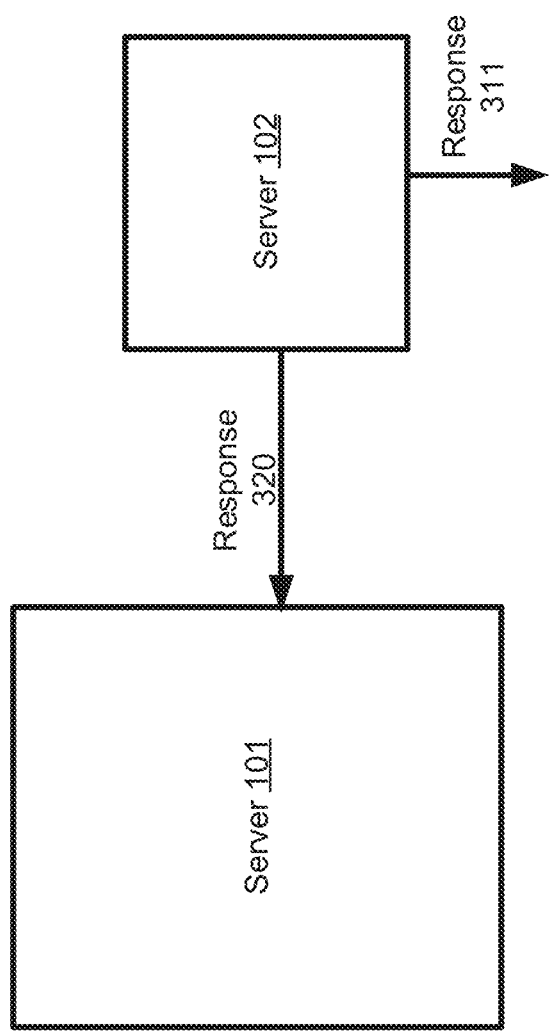

FIGS. 3A-3C are block diagrams of an example of using a wrap-in-lock to acquire the lock information 108. The server 101 may include a WIL 307, which may be called by any of the one or more other servers to acquire a lock. Then, the WIL 307 may return the lock information regarding the acquired lock to the calling server. As an example, the WIL 307 may be a module which perform the functionality of creating an outgoing request, in response to receiving an incoming request from other server, by copying the incoming request to be used as a main body of the outgoing request and adding the lock information of the acquired lock to metadata of the outgoing request. The WIL 307 may wrap the incoming request, for example, the WIP 307 may treat the incoming request as a black box by copying the incoming request and use the incoming request as the main body of the outgoing request. In this way, the other server may acquire the lock information, store the lock information in a local locking table and pass lock checks when executing applications codes associated with the lock.

Referring to FIG. 3A, the server 102 may receive a request 301 directly from a user. The server 102 may recognize the request 301 is directly from the user, without going through the server 101, thus, a lock 305 is needed from the server 101. The server 102 may call the WIL 307 of the server 101. The server 102 may send a WIL request 303 to the WIL 307, to acquire the lock 105. The WIL request 303 may indicate the request 301 directly from the user is received on the server 102 and ask to acquire the lock 305 through the WIL 307. The WIL 307 may obtain the lock information 108 of the lock 105. The WIL 307 may determine whether the lock has already been taken. If the lock 105 has already been taken, for example, by another service on the server 101 or another server (e.g., server 103), the server 101 may send a response (not shown) back to the server 102 to fail the WIL request 303. For example, the response may indicate the lock 105 has already been taken and reject the WIL request 303. In this way, conflicting operations for the same account or object are avoided and mutual exclusion is enforced.

Referring to FIG. 3B, if the lock 105 is available, the WIL 307 may obtain the lock information 108 of the lock 105. The WIL 307 may take the lock 105 and hold the lock 105. For example, the WIL 307 may call the lock database 104 and obtain the lock information 108 (e.g., the token) of the lock 105. The WIL 307 may wrap the WIL request 303, for example, the WIP 307 may treat the WIL request 303 as a black box by copying the WIL request 303 and use the WIL request 303 as a main body of a request 316. The WIP 307 may not change the WIL request 303, but only copy the WIL request 303 and use the WIL request 303 as the main body of the request 316. The WIL 307 may further add the lock information 108 to the request 316 by attaching the lock information 108 to metadata of the request 316. The WIL 307 may send the request 316 including the lock information 108, which may be included the metadata 316, to the server 102.

The server 102 may receive the request 316 including the metadata 316b with the lock information 108, which is similar to the request 116 discussed in FIG. 1. Similar as discussed in FIG. 1, the inbound handler 121 of the server 102 may check whether there is the lock information 108 in the metadata 316B and store the lock information 108 of the lock 105 into the locking table 123 of the server 102. When executing application code, the server 102 may run the lock checks to determine whether the lock 105 exists based on the lock information 108 in the locking table 123. The lock checks for the lock 105 may be passed based on the locking information 108 in the locking table 123. The server 102 may further send a request 318 to the server 103 and pass the lock information 108 of the lock 105 to the server 103.

Referring to FIG. 3C, in one embodiment, after executing the application code to perform the service of the request 316 and the service is completed, the server 102 may send a response 320 to the server 101. For example, the response 320 may indicate the service being completed, e.g., the subscription being created, the invoice of the service, the receipt of the money being withdrawn, etc. The response 320 may further include an indication to release the lock 105. The server 101 may release the lock 105. The server 102 may send a response 311 to the user to indicate the service being completed, e.g., the subscription being created, the invoice of the service, the receipt of the money being withdrawn, etc.

Referring to FIGS. 3A-3C, the WIL 307 enables the lock information 108 of the lock 105 on the server 101 to be used in other servers 102, 103 even though the initial request (e.g., request 301) from the user is not received by the server 101 directly. In this way, the server 102 and/or the server 103 may acquire the lock information 108 of the lock 105 and pass lock checks associated with the lock 105. Since the server 101 is actually holding the lock 105, conflicting operations for the same account or object are avoided and mutual exclusion is enforced. The lock 105 may be handled across the multiple servers 101, 102, 103 without roundtrips to a standalone centralized lock managing server, thus, the latency is reduced. Furthermore, the application code of the server 101 associated with the lock may still be reused in the servers 102, 103. Therefore, the time to develop the codes and the computing resources are saved.

In addition, the server 102 may call other, existing application code on the server 101 with the lock information 108 received from the WIL 307, without ending up with a deadlock situation, since the lock information 108 is passed around between the servers rather than the server 101 attempting to take the lock 105 again. For example, after the server 102 may receive the lock information 108 from the WIL 307 on the server 101, the server 102 may make a subsequent call to the server 101. If the subsequent call on the server 101 depends on the lock 105 being held on the server 101, the subsequent call will work because the WIL 307 has taken the lock 105 on the server 101 itself even though the call originated on the server 102. However, if the server 102 took the lock 105 directly instead of using the WIL 307, the subsequent call to the server 101 will not work because the server 101 would not know it took the lock 105 and might attempt to take the lock 105 again, resulting in a deadlock situation.

Figure 4:
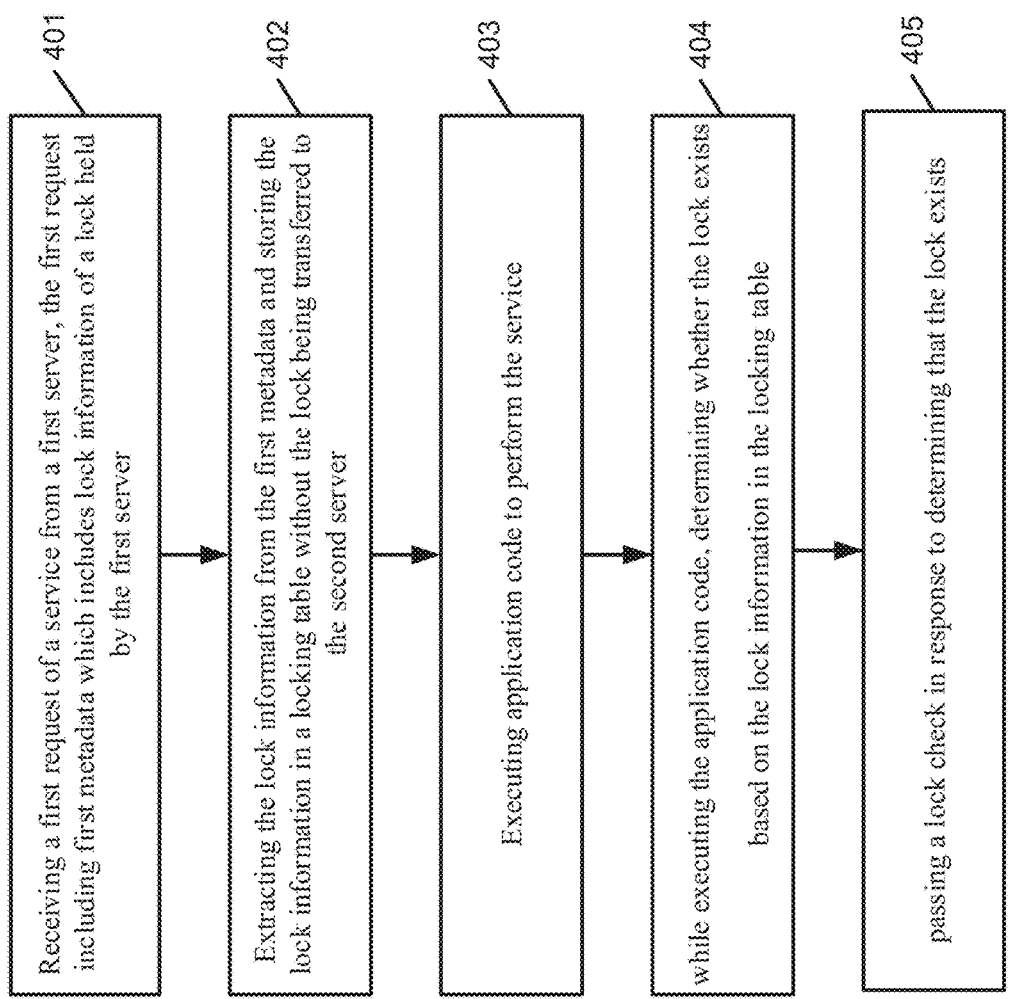
FIG. 4 is a flow diagram of one embodiment of a process of lock handling across multiple servers.

FIG. 4 is a flow diagram of one embodiment of a process of lock handling across multiple servers. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 4, the process begins by receiving, by a second server, a first request of a service from a first server, the first request including first metadata which includes lock information of a lock held by the first server (processing block 401).

Then the process includes extracting, by the second server, the lock information from the first metadata and storing, by the second server, the lock information in a locking table, without the lock being transferred to the second server (processing block 402).

The process further includes executing application code to perform the service based on the locking table (processing block 403).

The process further includes, while executing the application code, determining whether the lock exists based on the lock information in the locking table (processing block 404).

The process further includes passing a lock check in response to determining that the lock exists (processing block 405).

Figure 5:
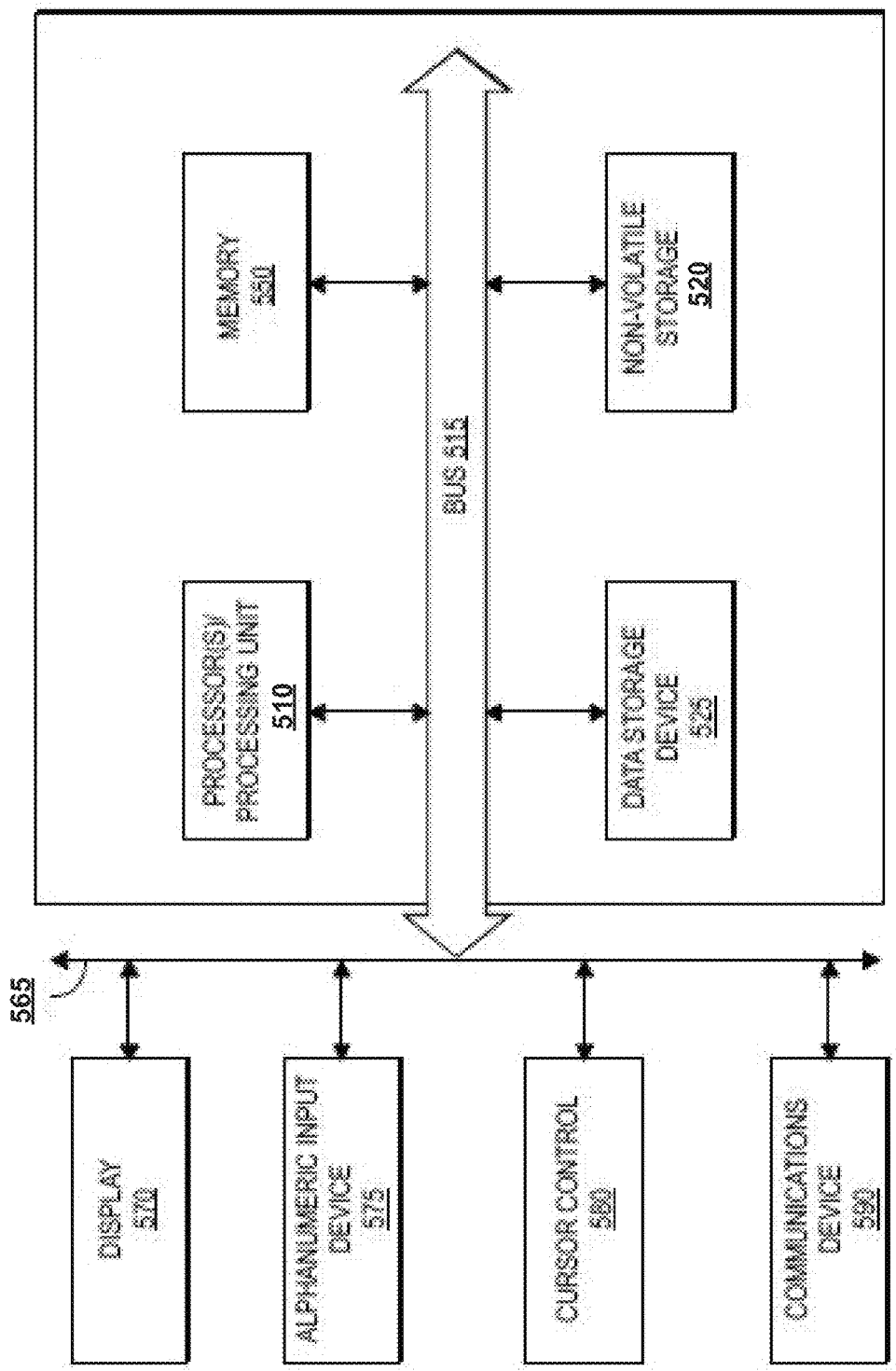
FIG. 5 is a block diagram of one embodiment of a computer system that may be used to support the systems and operations discussed herein.

FIG. 5 is one embodiment of a computer system that may be used to support the systems and operations discussed herein. It will be apparent to those of ordinary skill in the art, however, that other alternative systems of various system architectures may also be used.

The data processing system illustrated in FIG. 5 includes a bus or other internal communication means 515 for communicating information, and a processor(s) 510 coupled to the bus 515 for processing information. The system further comprises a random-access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor(s) 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

In one embodiment, processor(s) 510 executes instructions to perform any of the operations described above including, but not limited to, transmitting, by a first server, a first request of a service to a second server, the first request including first metadata which includes lock information of a lock which the first server is holding; extracting, by the second server, the lock information from the first metadata; and storing, by the second server, the lock information in a locking table on the second server to pass a lock check to verify the lock is being held by the second server.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 565, the processor 510, and memory 550 and/or 520. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 565, and memory 550, and only rudimentary communications mechanisms, such as a small touch-screen that permits the user to communicate in a basic manner with the device. In general, the more special-purpose the device is, the fewer of the elements need to be present for the device to function.

There are a number of example embodiments described herein.

Example 1 is a method by a second server comprising: receiving a first request of a service from a first server, the first request including first metadata which includes lock information of a lock held by the first server; extracting the lock information from the first metadata and storing the lock information in a locking table without the lock being transferred to the second server; and executing application code to perform the service, including, while executing the application code, determining whether the lock exists based on the lock information in the locking table, and passing a lock check in response to determining that the lock exists.

Example 2 is the method of example 1 that may optionally include that searching for the lock information in the locking table; and determining that the lock exists in response to find the lock information in the locking table.

Example 3 is the method of example 1 that may optionally include that the lock information includes at least one of a lock token, a timeout, or a lease of the lock, and wherein the lock token uniquely identifies the lock.

Example 4 is the method of example 1 that may optionally include that the second server includes an inbound handler to extract the lock information from the first metadata and store the lock information in the locking table on the second server.

Example 5 is the method of example 1 that may optionally include that the second server includes an outbound handler, and the method further comprises sending, by the outbound handler of the second server, a second request to a third server, the second request including second metadata which includes the lock information of the lock.

Example 6 is the method of example 1 that may optionally include that receiving, by the second server, an initial request of the service from a user; and transmitting, by the second server, a wrap-in-lock request to the first server, in response of receiving the initial request.

Example 7 is the method of example 6 that may optionally include that the first request is created by the first server by copying the wrap-in-lock request to a main body of the first request and adding the lock information to the first metadata of the first request.

Example 8 is the method of example 7 that may optionally include that transmitting, by the second server, a response to the first server with an indication to lease the lock in response to a completion of the service.

Example 9 is one or more non-transitory computer readable storage media having instructions stored thereupon which, when executed by a system having at least a processor and a memory therein, cause the system to perform operations comprising: receiving, by a second server, a first request of a service from a first server, the first request including first metadata which includes lock information of a lock held by the first server; extracting the lock information from the first metadata and storing the lock information in a locking table without the lock being transferred to the second server; and executing application code to perform the service, including, while executing the application code, determining whether the lock exists based on the lock information in the locking table, and passing a lock check in response to determining that the lock exists.

Example 10 is the computer readable storage media of example 9 where the operations may optionally include that searching for the lock information in the locking table; and determining that the lock exists in response to find the lock information in the locking table.

Example 11 is the computer readable storage media of example 9 that may optionally include that the second server includes an inbound handler to extract the lock information from the first metadata and store the lock information in the locking table on the second server, and the second server includes an outbound handler, and the operations may optionally include sending, by the outbound handler of the second server, a second request to a third server, the second request including second metadata which includes the lock information of the lock.

Example 12 is the computer readable storage media of example 9 where the operations may optionally include that receiving, by the second server, an initial request of the service from a user; and transmitting, by the second server, a wrap-in-lock request to the first server, in response of receiving the initial request.

Example 13 is the computer readable storage media of example 12 where the operations may optionally include that the first request is created by the first server by copying the wrap-in-lock request to a main body of the first request and adding the lock information to the first metadata of the first request.

Example 14 is the computer readable storage media of example 9 where the operations may optionally include that transmitting, by the second server, a response to the first server with an indication to lease the lock in response to a completion of the service.

Example 15 is a system comprising: a memory to store instructions; and one or more processors coupled to the memory to execute the stored instructions to: receive, by a second server, a first request of a service from a first server, the first request including first metadata which includes lock information of a lock held by the first server; extract the lock information from the first metadata and store the lock information in a locking table without the lock being transferred to the second server; and execute application code to perform the service, including, while executing the application code, determine whether the lock exists based on the lock information in the locking table, and pass a lock check in response to determining that the lock exists.

Example 16 is the system of example 15 that may optionally include that where the one or more processors are further to search for the lock information in the locking table; and determine that the lock exists in response to find the lock information in the locking table.

Example 17 is the system of example 15 that may optionally include that the second server includes an inbound handler to extract the lock information from the first metadata and store the lock information in the locking table on the second server, and the second server includes an outbound handler, and where the one or more processors are further to send, by the outbound handler of the second server, a second request to a third server, the second request including second metadata which includes the lock information of the lock.

Example 18 is the system of example 15 that may optionally include that where the one or more processors are further to receive, by the second server, an initial request of the service from a user; and transmit, by the second server, a wrap-in-lock request to the first server, in response of receiving the initial request.

Example 19 is the system of example 18 that may optionally include that the first request is created by the first server by copying the wrap-in-lock request to a main body of the first request and adding the lock information to the first metadata of the first request.

Example 20 is the system of example 15 that may optionally include that where the one or more processors are further to transmit, by the second server, a response to the first server with an indication to lease the lock in response to a completion of the service.

Example 21 is a method by a first server comprising: taking and holding a lock; and transmitting a first request of a service to a second server, the first request including first metadata which includes lock information of the lock held by the first server, wherein the lock information is to be extracted from the first metadata and stored the lock information in a locking table of the second server without the lock being transferred to the second server, and wherein application code to perform the service is executed to perform the service based on the lock information in the locking table on the second server.

Example 22 is the method of example 21 that may optionally include that receiving a wrap-in-lock request from the second server, in response of that the second server receiving an initial request from a user.

Example 23 is the method of example 22 that may optionally include that creating the first request by copying the wrap-in-lock request to a main body of the first request and adding the lock information to the first metadata of the first request.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the disclosure.

We claim:

1. A method by a second server, comprising:
receiving a first request of a service from a first server, the first request including first metadata which includes lock information of a lock held by the first server;
extracting the lock information from the first metadata and storing the lock information in a locking table without the lock being transferred to the second server; and
executing application code to perform the service, including, while executing the application code,
determining whether the lock exists based on the lock information in the locking table, and
passing a lock check in response to determining that the lock exists.

2. The method of claim 1, further comprising
searching for the lock information in the locking table; and
determining that the lock exists in response to find the lock information in the locking table.

3. The method of claim 1, wherein the lock information includes at least one of a lock token, a timeout, or a lease of the lock, and wherein the lock token uniquely identifies the lock.

4. The method of claim 1, wherein the second server includes an inbound handler to extract the lock information from the first metadata and store the lock information in the locking table on the second server.

5. The method of claim 1, wherein the second server includes an outbound handler, the method further comprising:
sending, by the outbound handler, a second request to a third server, the second request including second metadata which includes the lock information of the lock.

6. The method of claim 1, further comprising
receiving an initial request of the service from a user; and
transmitting a wrap-in-lock request to the first server, in response of receiving the initial request.

7. The method of claim 6, wherein the first request is created by the first server by copying the wrap-in-lock request to a main body of the first request and adding the lock information to the first metadata of the first request.

8. The method of claim 1, further comprising
transmitting a response to the first server with an indication to lease the lock in response to a completion of the service.

9. One or more non-transitory computer readable storage media having instructions stored thereupon which, when executed by a system having one or more processors and a memory therein, cause the system to perform operations comprising:
receiving, by a second server, a first request of a service from a first server, the first request including first metadata which includes lock information of a lock held by the first server;
extracting the lock information from the first metadata and storing the lock information in a locking table without the lock being transferred to the second server; and
executing application code to perform the service, including, while executing the application code,
determining whether the lock exists based on the lock information in the locking table, and
passing a lock check in response to determining that the lock exists.

10. The one or more non-transitory computer readable storage media of claim 9, wherein the operations further comprise,
searching for the lock information in the locking table; and
determining that the lock exists in response to find the lock information in the locking table.

11. The one or more non-transitory computer readable storage media of claim 9, wherein the second server includes an inbound handler to extract the lock information from the first metadata and store the lock information in the locking table on the second server, wherein the second server includes an outbound handler, and wherein the operations further comprise,
sending, by the outbound handler of the second server, a second request to a third server, the second request including second metadata which includes the lock information of the lock.

12. The one or more non-transitory computer readable storage media of claim 9, wherein the operations further comprise,
receiving, by the second server, an initial request of the service from a user; and
transmitting, by the second server, a wrap-in-lock request to the first server, in response of receiving the initial request.

13. The one or more non-transitory computer readable storage media of claim 12, wherein the first request is created by the first server by copying the wrap-in-lock request to a main body of the first request and adding the lock information to the first metadata of the first request.

14. The one or more non-transitory computer readable storage media of claim 9, wherein the operations further comprise,
transmitting, by the second server, a response to the first server with an indication to lease the lock in response to a completion of the service.

15. A system comprising:
a memory to store instructions; and
one or more processors coupled to the memory to execute the stored instructions to:
receive, by a second server, a first request of a service from a first server, the first request including first metadata which includes lock information of a lock held by the first server;
extract the lock information from the first metadata and storing the lock information in a locking table without the lock being transferred to the second server; and
execute application code to perform the service, including, while executing the application code, wherein the one or more processors are further to
determine whether the lock exists based on the lock information in the locking table, and
passing a lock check in response to determining that the lock exists.

16. The system of claim 15, wherein the one or more processors are further to
- search for the lock information in the locking table; and
- determine that the lock exists in response to find the lock information in the locking table.

17. The system of claim 15, wherein the second server includes an inbound handler to extract the lock information from the first metadata and store the lock information in the locking table on the second server, wherein the second server includes an outbound handler, and wherein the one or more processors are further to
- send, by the outbound handler of the second server, a second request to a third server, the second request including second metadata which includes the lock information of the lock.

18. The system of claim 15, wherein the one or more processors are further to
- receive, by the second server, an initial request of the service from a user; and
- transmit, by the second server, a wrap-in-lock request to the first server, in response of receiving the initial request.

19. The system of claim 18, wherein the first request is created by the first server by copying the wrap-in-lock request to a main body of the first request and adding the lock information to the first metadata of the first request.

20. The system of claim 15, wherein the one or more processors are further to
- transmit, by the second server, a response to the first server with an indication to lease the lock in response to a completion of the service.

21. A method by a first server, comprising:
taking and holding a lock; and
transmitting a first request of a service to a second server, the first request including first metadata which includes lock information of the lock held by the first server, wherein the lock information is to be extracted from the first metadata and stored the lock information in a locking table of the second server without the lock being transferred to the second server, and wherein application code to perform the service is executed to perform the service based on the lock information in the locking table on the second server.

22. The method of claim 21, further comprising
receiving a wrap-in-lock request from the second server, after the second server receiving an initial request from a user.

23. The method of claim 22, further comprising
creating the first request by copying the wrap-in-lock request to a main body of the first request and adding the lock information to the first metadata of the first request.

\* \* \* \* \*